2 Sheets--Sheet 1.

J. J. WEBSTER.
Improvement in Apparatus for Reducing Grain to Flour or Meal.
No. 131,485. Patented Sep. 17, 1872.

Witnesses

Inventor
J. J. Webster

AM. PHOTO-LITHOGRAPHIC CO. N.Y. (OSBORNE'S PROCESS.)

J. J. WEBSTER.
Improvement in Apparatus for Reducing Grain to Flour or Meal.
No. 131,485. Patented Sep. 17, 1872.
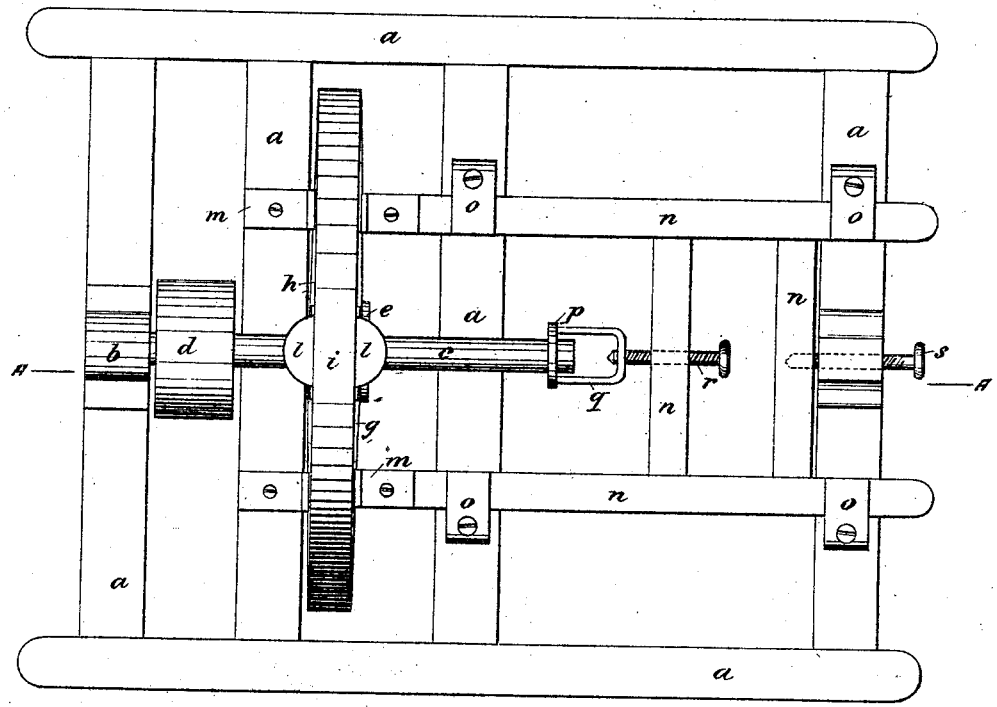
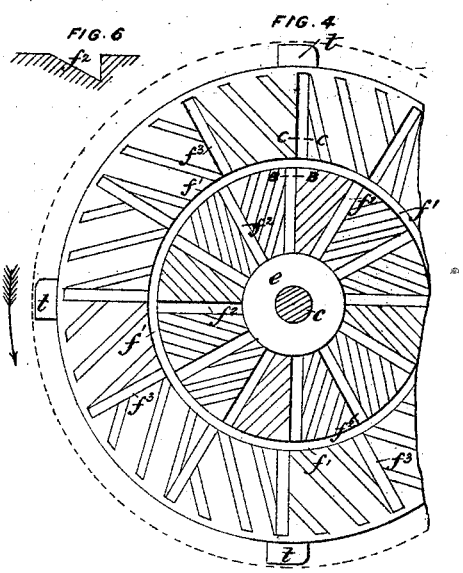
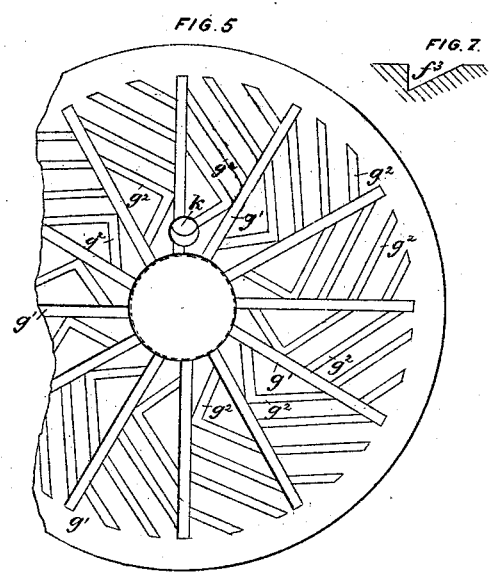
Witnesses
Inventor

UNITED STATES PATENT OFFICE.

JEROME JOSIAH WEBSTER, OF MAGOG, CANADA.

IMPROVEMENT IN APPARATUS FOR REDUCING GRAIN TO FLOUR OR MEAL.

Specification forming part of Letters Patent No. 131,485, dated September 17, 1872.

*To all whom it may concern:*

Be it known that I, JEROME JOSIAH WEBSTER, of the village of Magog, in the District of St. Francis, in the Province of Quebec, Canada, have invented new and useful Improvements on "Apparatus for Reducing Grain to Flour or Meal;" and I do hereby declare that the following is a full, clear, and exact description of the construction and operation of the same, reference being had to the annexed drawing, where—

Figure 1:
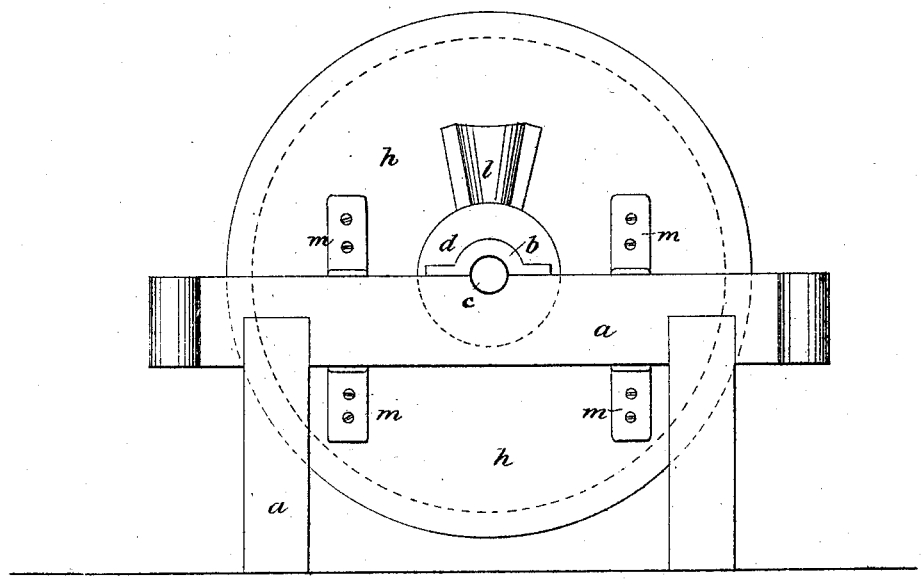
Figure 2:
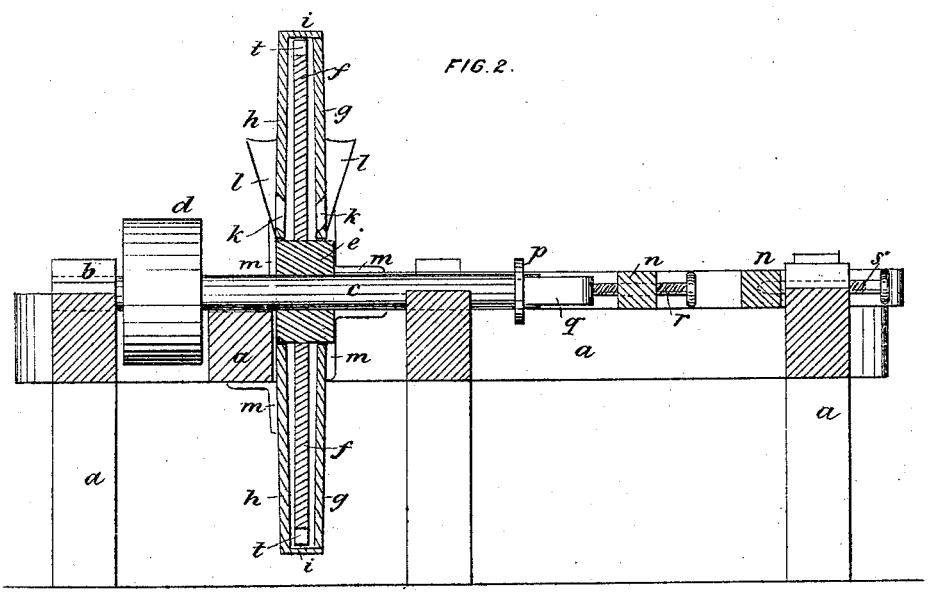

Figure 1 represents an end elevation of the machine. Fig. 2 represents a sectional elevation on line A A. Fig. 3 represents a plan of machine. Fig. 4 represents a view of disk $f$. Fig. 5 represents a view of outside disk $g$. Fig. 6 represents a section on line B B. Fig. 7 represents a section on line C C.

This invention belongs to that class of machines which are adapted for reducing grain, &c., to flour by concussion and attrition instead of by grinding simply; and consists, mainly, in the employment in a suitable machine of a disk having certain peculiar grooves, as will be described hereinafter, and the combination of this disk with other operating parts of the machine, as will be fully set forth.

I do not confine myself to one particular or stated size of machine, as it will be varied for different requirements.

In the drawing similar letters of reference indicate like parts.

Letter $a$ is the framing which carries the apparatus, which must be sufficiently strong and so braced together as to be able to resist the vibration, and, if found convenient, secured to any suitable bed. To the framing $a$ is secured a plumber-block, $b$, which receives one end of a shaft, $c$, $d$ being a driving-pulley placed thereon. To this shaft $c$, and revolving with it, or preferably, as shown, to a collar or hub, $e$, fixed on the shaft $c$, is secured a disk, $f$, shown in Fig. 4, to be hereinafter more particularly described. This disk $f$ is inclosed between two disks, $g$ and $h$, slightly concave on their inner sides, and bored out at the center so as just to allow the collar or hub $e$ of the shaft $c$ to revolve freely through them. $i$ is a short cylinder, forming a periphery to the disks $g$ and $h$. It may be either made separate and secured to the disk $h$ or in one with it, in either case forming a rubbing-joint with the disk $g$.

In each of the disks $g$ and $h$ is formed, a little distance above the center, an aperture, $k$, for the admission of grain to the machine, each of these apertures being inclosed by a hopper, $l$, preferably of the configuration shown in Figs. 1, 2, and 3, which directs the grain received in it to the aperture $k$. In the lower part of the periphery $i$ are formed one or more apertures for the flour or meal to escape from the machine. The disks $g$ and $h$ are firmly fixed— the disk $h$ to the frame $a$ by means of angle or L irons $m$, and the disk $g$ in the same manner to a frame, $n$, resting in grooves cut in the frame $a$, and held firmly in position by clamps $o$, as shown in Figs. 2 and 3. The inner end of the shaft $c$ is carried in any suitable bush or bearing formed in the frame $a$, and has secured to it a collar, $p$, with a clevis-shaped iron, $q$, projecting at right angles to it. Into the end of this works a set-screw, $r$, passing, as shown in Figs. 2 and 3, through a cross-rail of the frame $n$, and by its action moving the shaft $c$, and with it the disk $f$, in the direction of its axis, and therefore bringing it closer to or moving it further from the disk $h$. The frame $n$, and with it the disk $g$, is moved back and forth by means of a set-screw, $s$, passing through the frame $a$, and working in a cross-rail of $n$, and by its action increasing or diminishing the distance between the disks $g$ and $f$. The disk $f$ is grooved as follows: At about half the distance between the collar or hub $e$ and the periphery of the disk is cut a concentric groove, $f^1$, and radiating from the center are cut any convenient number (twelve being shown in the drawing) of grooves, $f^2 f^3$, one side square and the other bevel with the face of the disk, the square side of the grooves $f^2$ being opposite to the direction of rotation, as shown in Fig. 6, and vice versa in the grooves $f^3$, as shown in Fig. 7. From these grooves $f^2 f^3$ pass diagonally, along the face of the disk, grooves $f^4$, formed by two meeting bevels, or slightly rounded, as may be found most convenient, carried out from the square side of the radial grooves $f^2 f^3$ at an angle of about forty-five degrees. These radial and diagonal grooves $f^3 f^4$ are not carried quite to the periphery, but are stopped so as to leave a narrow ring of plain face all round. In the disks $g$ and $h$ a groove corresponding to the groove $f^1$ is omitted, radial grooves $g^1$ and $h^1$, as in the disk $f$, being carried out from the center to within a short distance of the circumference, the square side of these grooves being placed as in the grooves $f^2$, and diagonal grooves $g^2$ and $h^2$, of the same shape as the grooves $f^4$, being arranged so as when in place to be in the reverse direction to those on the disk $f$. To the periphery of the disk $f$ are secured or made in one with it any convenient number of projections $t$, of the shape shown in Fig. 4.

The disks $f$, $g$, and $h$ might preferably be made of cast or wrought iron; but it must be clearly understood that I do not confine myself to any special material, as any substance found most convenient may be used in the construction of the machine.

The operation of my invention is as follows: The pulley $b$, being rotated by any suitable power and means, causes the shaft $c$ and the disk $f$ on the collar or hub $e$ to revolve at any given or desired rate, (seven hundred to eight hundred revolutions per minute being found to be very effective,) the exact position of the disk $f$ with reference to the disks $g$ and $h$ being arranged, as has been explained, by the set-screws $r$ and $s$, the former moving the shaft $c$, collar $e$, and disk $f$, and the latter the frame $n$ and disk $g$. Spouts of any kind connected with the grain to be reduced, and communicating with the hoppers $l$, lead the grain through the openings $k$ into the interior of the machine, the collar or hub $e$ preventing it from entering so close to the center as not to be affected by the centrifugal force. The grain then being struck by the grooves $f^2$ and $f^4$ on the revolving disk $f$, against the grooves $g^1$ $g^2$ $h^1$ $h^2$ on the outside-fixed disks, it is rapidly reduced to powder. The formation of the grooves $f^2$ tends to throw the grain being operated upon out from the center, and that of the grooves $f^3$ to keep it within the influence of the machine until it is reduced to the flour or meal required, when, by the centrifugal action of the machine and the strong current of air produced by the motion of the disk $f$, the flour or meal so manufactured is driven out through the opening or openings for that purpose formed in the lower portion of the periphery $i$, the projections $t$ assisting in keeping the machine clear.

Having thus described the construction and operation of my invention, what I claim is as follows:

1. The disk $f$, grooved substantially as and for the purpose described.

2. The combination of the disk $f$, with or without projection $t$, with grooves $f^1$, $f^2$, $f^3$, and $f^4$, disks $g$ and $h$ with grooves $g^1$ $g^2$ $h^1$ $h^2$, and periphery $i$, in combination with shaft $c$ and collar or hub $e$, substantially as and for the purposes described.

3. The combination of the shaft $c$, collar $p$, clevis-shaped iron $q$, set-screw $r$, and frame $n$, substantially as and for the purposes set forth.

4. The combination of the adjustable disk $g$, frame $n$, set-screws $s$, and frame $a$, substantially as and for the purposes set forth.

5. The combination of the disks $g$ and $h$ with apertures $k$ and hoppers $l$, substantially as and for the purposes set forth.

Montreal, 23d day of July, A. D. 1872.

J. J. WEBSTER.

Witnesses:
   FRAS. HY. REYNOLDS,
   R. A. KELLOWD.